United States Patent
Steklenski

(10) Patent No.: US 7,267,988 B2
(45) Date of Patent: *Sep. 11, 2007

(54) DOSIMETER WITH CONDUCTING LAYER

(75) Inventor: David J. Steklenski, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 592 days.

This patent is subject to a terminal disclaimer.

(21) Appl. No.: 10/394,371

(22) Filed: Mar. 21, 2003

(65) Prior Publication Data

US 2004/0184956 A1 Sep. 23, 2004

(51) Int. Cl.
 *G01N 23/00* (2006.01)
(52) U.S. Cl. .......................... 436/58; 436/57
(58) Field of Classification Search ............... 436/57, 436/58
See application file for complete search history.

(56) References Cited

U.S. PATENT DOCUMENTS

| | | | |
|---|---|---|---|
| 4,240,992 A * | 12/1980 | Petrie et al. ............. 264/21 |
| 4,417,142 A * | 11/1983 | Malmqvist et al. ........ 250/253 |
| 4,463,114 A * | 7/1984 | Balchunis et al. ......... 524/157 |
| 4,528,319 A * | 7/1985 | Ottaviani et al. ......... 524/540 |
| 4,668,714 A | 5/1987 | Morita et al. |
| 5,066,863 A * | 11/1991 | Hanisch et al. .......... 250/474.1 |
| 5,137,802 A * | 8/1992 | Ueda et al. ............. 430/523 |
| 5,179,281 A * | 1/1993 | Tawil et al. ............ 250/337 |
| 5,340,676 A | 8/1994 | Anderson et al. |
| 5,466,567 A | 11/1995 | Anderson et al. |
| 5,700,623 A | 12/1997 | Anderson et al. |
| 6,010,836 A * | 1/2000 | Eichorst et al. .......... 430/530 |
| 6,124,083 A | 9/2000 | Majumdar et al. |
| 6,190,846 B1 | 2/2001 | Majumdar et al. |
| 6,602,645 B1 * | 8/2003 | Nakamura et al. ........ 430/270.1 |
| 6,705,400 B1 * | 3/2004 | Nguyen et al. .......... 166/281 |
| 6,787,107 B2 * | 9/2004 | Steklenski ............... 422/56 |
| 2003/0099571 A1 | 5/2003 | Steklenski |

FOREIGN PATENT DOCUMENTS

EP 0 389 113 9/1990
WO 99/00677 1/1999

OTHER PUBLICATIONS

Japanese Abstract JP 61057878 A.
Japanese Abstract JP 64-025085.
Japanese Abstract JP 01-102388.
Japanese Abstract JP 64-046677.
T. Kojima et al., "Alanine Dosimeters Using Polymers As Binders", Applied Radiation & Isotopes, vol. 37, No. 6(1986), Pergamon Journals Ltd., pp. 517-520.
I. Janovsky et al., "A Polymer-Alanine Film For Measurements Of Radiation Dose Distributions", Appl. Radiat. Isot. vol. 39(7) pp. 651-657, 1998.
A. Bartolotta et al. "Dosimetry For Cobalt-60 Gamma Rays With Alanine*", Radiation Protection Dosimetry, vol. 9(4) pp. 277-281, 1984.

* cited by examiner

*Primary Examiner*—Jill Warden
*Assistant Examiner*—Paul Hyun

(57) ABSTRACT

An element for ascertaining radiation dosage comprising: a flexible polymeric support, a first coated layer, said coated layer comprising a electrically conducting material and a binder and a second coated layer, said coated layer comprising a binder and alanine wherein the alanine, upon exposure to ionizing radiation, produces radicals that remain stable for long periods of time.

38 Claims, No Drawings

DOSIMETER WITH CONDUCTING LAYER

FIELD OF THE INVENTION

The invention relates to a coated element that provides accurate and simple measurement of doses of local ionizing radiation in a prescribed area of interest. The element (or dosimeter) comprises a plastic support on which is disposed a layer coated from a solution in which alanine is uniformly dispersed in a solvent-soluble elastomeric binder and an electrically conducting layer to dissipate accumulated electrical charge.

BACKGROUND OF THE INVENTION

There are various processes that utilize radiation—e.g., sterilization, radiation therapy, food irradiation, quality checking, etc.—and these processes have a need to verify the radiation dose. Similarly, there is a large number of different methods to determine a dose—e.g., ion dosimetry (ionization in air), calorimetry (determination of heat in carbon or metals), thermoluminescence dosimetry (luminescence in solids), etc. The formation of radicals in solid organic substances on irradiation has been observed and the concentration of these radicals is proportional to the absorbed dose over a wide range. The concentration of the radicals can be determined easily by means of electron paramagnetic resonance (EPR) spectroscopy. Alanine has been widely used for this purpose due to its availability and the relative simplicity of incorporating it into practical dosimeters. An advantage of the use of organic materials such as alanine over inorganic dosimeter systems is that it can be assumed that the irradiation-induced changes in organic materials are closer to radiation effects in living tissues.

Alanine dosimetry is an accepted method to determine the radiation dose of different irradiation processes. On irradiating with ionizing radiation, radicals will be produced in alanine which are stable for long periods. This is mainly due to the inhibition of radical-radical recombinations in the crystalline structure of the material that prevents the migration of large molecule fragments. The non-destructive evaluation of the radical concentration can be done using EPR spectroscopy. The determination of irradiation doses by means of EPR techniques requires a sensitive, robust and reliable instrument that can be served by a laboratory worker. A useful instrument provides such features as automated procedures for calibration and measurements. Careful adjustment of the EPR spectrometer and the selection of suitable dosimeters allows the determination of dose rates in a range from 2 Gy to 200 kGy with a total uncertainty of 3.5% (confidence level of 95%). Alanine dosimeters are small, stable, and easy to handle. They are characterized by their large measuring range and a low sensitivity to temperature and humidity. This allows for their application in radiation therapy, the irradiation of blood, as well as in industrial facilities for irradiation. The dosimeter system can be used for reference and routine dosimetry due to its high quality and low costs.

Alanine dosimeters are well known in the art. For example, in the reference: T. Kojima et al., "Alanine Dosimeters Using Polymers As Binders", Applied Radiation & Isotopes, vol. 37, No. 6, (1986), Pergamon Journals Ltd., pp. 517-520, there are numerous references to dosimeters made in pellet, rod, and film formats. Prominent among these references are "A Polymer Alanine Film for Measurements of Radiation Dose Distributions", Appl. Radiat. Isot. Vol. 39 (7) pp. 651-657, 1988 and "Dosimetry for Cobalt-60 Gamma Rays with Alanine", Radiation Protection Dosimetry, vol. 9 (4) pp. 277-281 1984. Dosimeters have been made both by industrial laboratories and at academic institutions. Many of these dosimeters are in the form of molded pellets or rods. The alanine is generally blended with a synthetic or natural rubber, compounded and molded under pressure to form a variety of shapes (U.S. Pat. No. 4,668,714, J.P. 203276 J.P. 0125085, J61057-878-8). There are also references in the literature to extruded films (J01102-388-A). These extruded products, while working well, have several deficiencies. Their manufacture often requires the use of high pressures and temperatures during the molding process, requiring molding equipment that limits the sizes and shapes available. Molded dosimeters are also limited in that only moldable polymeric binders may be used. The use of molded dosimeters is also somewhat restrictive, as the size of the dosimeters tends to be very small, leading to difficulties in handling and possibly loss during irradiation.

A potential solution to these difficulties would be an alanine dosimeter coated onto a flexible support wherein the support serves not only to hold the alanine, but also provides the user with a length and width that allow easy handling. Such a coated dosimeter has been described in DE 19637471 A. In this art, the alanine is coated from two, specific binders—a polyoctenamer or polystyrene. Both of these binders are brittle materials and make the coating of thick alanine layers with good mechanical properties very difficult, especially when the thickness of the dosimeter layer is >100 microns. The ability to bend and shape the alanine dosimeter coated on to the plastic support can be very important in some applications, and is a significant limitation of the coated dosimeters described in the art. U.S. application Ser. No. 09/995,080 describes coated dosimeters using elastomeric binders, which overcome this limitation to provide dosimeters that are highly flexible.

Several types of radiation are used in industry to effect sterilization or in materials processing. Gamma radiation, especially that from Cobalt 60, is very commonly used in the irradiation of food stuffs. Electron beam (e-beam) technologies are used in the irradiation of foods, but are also used in the sterilization of medical device and the crosslinking of polymeric materials to improve durability and chemical resistance. One problem with dosimeters known in the art, when used with electron beam irradiation, is the accumulation of charge on the surface of the dosimeter. This charge, which is in the form of free electrons, is read as a signal by the EPR spectrometer and gives a false indication of the dose received by the irradiated object. While the charge does eventually dissipate, the length of time between irradiation and the time at which the dosimeter is free of charge and indicates a stable reading can be several hours and can be a major inconvenience to the irradiating facility.

It would be useful in the industry to have a dosimeter that dissipates electron beam induced charge quickly so that accurate dosimetry readings could be made shortly after irradiation.

SUMMARY OF THE INVENTION

The present invention discloses an element that functions as a dosimeter, the element comprised of a thin alanine containing layer coated on a flexible plastic support bearing an electrically conducting layer. The alanine is uniformly dispersed in a solvent-soluble binder to form a coating solution and the solution is used to coat a support. The conducting layer is applied either under the alanine-containing layer or to the reverse side of the support. Hence the invention describes an element for ascertaining radiation dosage comprising: a support on which is disposed a first coated layer, said first coated layer comprising a first binder and alanine; wherein the alanine, upon exposure to ionizing radiation, produces radicals that remain stable for long periods of time and a second coated layer comprising a second binder and an electrically conducting material. The first and second binder may be the same or different but are preferably different to allow the properties of each layer to be separately optimized. As used herein, the term "long periods of time" means that the signal detected from the dosimeter should remain stable to within ±2% for a period of at least 7 days so that the user of the dosimeter can be confident of the measurement even if there is a significant delay between the irradiation and reading of the dosimeter. The dosimeter will generally be read between 15 minutes and 60 minutes of irradiation but sometimes, especially where the irradiation is conducted at a remote site, reading can take place as long as 7 days after irradiation. The stability of the dosimeter signal is also important should a reading need to be verified at some time after the initial reading is taken.

The present invention offers several advantages. The support is flexible and durable; avoiding the brittleness known in the prior art. The coating processes used afford the manufacturer greater control and therefore greater uniformity in the alanine content. The element can be easily handled and easily manufactured in large volume. The presence of the conducting layer allows the charge built up in an electron beam exposure to dissipate rapidly so that accurate dosimetry can be performed very shortly after irradiation.

DETAILED DESCRIPTION OF THE INVENTION

Important to the manufacture of practical, coated, alanine dosimeters is the selection of binder materials that allow the coating of high fractions of alanine in the layer, and yet are flexible enough to allow the alanine layer to bend without cracking or breaking when coated at thickness >100 micron. Binders such as the polystyrene, mentioned in the previous art, are too brittle to allow a coating of the thick layers required. Far better are elastomeric binders that have high levels of elongation to break and bond well both to plastic substrates and the alanine. Elastomers whose elongation to break is at least 10% work well in the practice of the invention and particularly preferred are those whose elongation to break is greater than 100%. A key element in the choice of a binder is that the binder must not form free radicals that would interfere with the alanine signal upon exposure to ionizing radiation. In order to provide a dosimeter whose signal is resistant to the effects of high ambient humidity, the binder must also have a low permeability of water vapor. Examples of several common elastomeric binders and their permeability to water are shown in Table 1 below. The permeability P is defined as:

$$P = \frac{(\text{quantity of permeant}) \times (\text{film thickness})}{(\text{area}) \times (\text{time}) \times (\text{pressure drop across the film})}$$

and is given in the units:

$$\frac{cm^3 \text{ (at } STP\text{)} \times cm}{cm^2 \times s \times Pa}$$

where s=time in seconds and Pa is the pressure in Pascals.

TABLE 1

| Elastomeric Binder | Permeability ×10$^{13}$ |
|---|---|
| Poly(ethyl methacrylate) | 2400-2600 |
| Polyurethane Elastomer | 3000-8000 |
| Poly(methacrylonitrile) | 300-350 |
| Poly(methyl methacrylate) | 400-500 |
| Nylon 66 | 650-750 |
| Polycarbonate | 1000-1500 |
| Poly(vinyl butyral) | 600-650 |
| Cellulose Acetate | 5500-6000 |
| Ethyl cellulose | 6500-7000 |

The polymers in table 1 provide the physical properties of acceptable coated dosimeters, but have permeability to moisture that can lead to loss of signal in highly moist environments. The polymers in table 2 below are examples of materials that have a permeability below 100 and are preferred for the practice of this invention. Most preferred are binders whose permeability to water is below 10. In each case, the binders listed have enough resistance to the permeability of water to provide a dosimeter with a stable signal in high RH environments. Of the binders listed, Polyvinylidenefluoride-co-tetrafluoethylene) is preferred for the practice of the invention.

TABLE 2

| Elastomeric Binder | Permeability ×10$^{13}$ |
|---|---|
| Poly(vinylchloride-co-vinyl acetate) | 70-80 |
| Poly(vinylidene chloride) | 3-10 |
| Poly(vinylidene fluoride) | 0.2-5 |
| Polyvinylidenefluoride-co-tetrafluoethylene)-Kynar 7201 | 1-5 |
| Poly(chlorotrifluoroethylene)-KelF | 0.2-0.4 |
| Poly (vinylidenechloride-co-acrylonitrile)-Saran F310 | 0.5-2 |

The binder may also be a compatible polymer blend or polymer alloy having low permeability to water and water vapor as described above. An example of a preferred polymer blend is a combination of poly (methyl methacrylate), (Elvacite 2010, ICI Polymers) and poly (vinylidenefluoride-co-tetrafluoethylene) (Kynar 7201, Atochem).

The binder is present at between 10 and 80 wt. % of the final layer. Most preferably the binder is present at between 35 and 50 wt. % of the final layer so as to provide optimum flexibility while still allowing a high coverage of the alanine to be applied.

The support for the present alanine dosimeter may be any one of a number of plastic supports such as polyethylene film, polyamide film, polyimide film, polypropylene film, polycarbonates, cellulosic supports, and polyester supports and the like, ordinary paper, and processed paper such as photographic paper, printing paper such as coated paper and art paper, baryta paper, and resin-coated paper. The support should be able to wrap around a rod of 0.1875"-0.25" diameter without showing signs of cracking, crazing or other damage. The support should also be resistant to the effects of coating solvents and normal ambient conditions. The preferred support is oriented polyester with a thickness of 2-14 mil. Most preferably, the polyester support would be within the range of 6-10 mil to provide reasonable stiffness for ease of handling while retaining the desired degree of flexibility for applications where bending of the dosimeter is required. The polyester would be clear in the preferred use, but white (pigmented with $TiO_2$ or $BaSO_4$) supports are also useful. A primary requirement of the pigment or tinting material is that it must not interfere with the signals generated by the alanine. In the preferred embodiment, the support is clear (non-pigmented and undyed). The support preferably contains an adhesion promoting sub layer to improve substrate wetting and the adhesion of the alanine layer.

Alanine is useful because, on irradiation with ionizing radiation, it produces radicals in proportion to the radiation dose received and the radicals produced remain stable for a period of at least several hours so that the radical concentration can be read. For the purposes of the present invention, alanine is preferred and should be in the L-alanine form. The crystalline material should have a particle size in the range of 0.1-200 microns before coating. In order to form the alanine layer, crystals of L-alanine are dispersed in solvent along with the binder. In general, the alanine crystals are too large to be coated as they are received from the manufacturer and must be ground to smaller size. The particle size reduction can be accomplished by any standard method. Examples of such methods are dry grinding by means of a ball mill or attritor, wet milling by means of a media mill, rod milling, and hammer milling. Other methods such as precipitation, spray drying, and recrystallization are also useful. It is preferred that the alanine particles are less than 100 microns in size. It is particularly preferred that the alanine particles range between 1 and 40 microns in size.

Solvents for the dispersion may be any solvent that dissolves the binder, but solvents that evaporate quickly such as ketones(acetone, methylethyl ketone), alcohols (methanol, ethanol), acetates (methylacetate) and chlorinated solvents such as methylene chloride are preferred. Acetone, methylene chloride and mixtures of methylene chloride and methanol are particularly preferred.

Various addenda may be added to the alanine/binder mixture. Amorphous silica or alumina may be added in amounts from 0.1 to 5% of the weight of the alanine to improve particle flow characteristics. Preferably silica is the flow additive and is added at levels from 0.25-1% by weight of the alanine. Surfactants may also be added in amounts from 0.01-1% weight % of the total dispersion as coating and leveling aids. Preferred coating aids are the silicone additives typified by DC1248 manufactured by Dow Coming Inc.

Coating of the alanine-containing layer can be done by common coating methods such as dip coating, roll coating, and extrusion hopper coating. The alanine dispersion may be coated over the entire width/length of the support/dosimeter or over only a portion. Particularly preferred for application of the alanine-containing dispersion to the support is the use of extrusion hopper coating. This type of coating is well known to be able to lay down precise amounts of dispersion resulting in reproducible coverages. After the dispersion is applied to the support, the coated layer is dried. Initial drying is done at relatively low temperatures, such as from 20-35° C. with restricted airflow to prevent the occurrence of drying defects such as cells, cracks, orange peel, and the like. The initial drying is followed by a second warming step at higher temperatures, from 50-120° C. where the layer is cured and the final amounts of solvent removed from the coating. The desired coating thickness is dependent on the radiation level that is to be detected with thicker layers required to detect lower doses. The thickness of the alanine layers of this invention can be from 10-300 microns. The preferred thickness is between 100 and 200 microns and most preferably between 125 and 175 microns where an excellent compromise between detectability and handling characteristics is obtained.

The alanine-containing layer is robust as formulated, however there may be occasions where a protective overcoat may be desirable. Such an overcoat would provide resistance to exposure to contamination and could serve to protect the dosimeter from exposure to excessive moisture. As in the case of the binder for the alanine-containing layer, a primary requirement of the overcoat layer is that it must not generate free radicals upon irradiation whose EPR signal interferes with that of the alanine. Typical overcoat polymers would possibly include acrylates, methacrylates, cellulosics such as cellulose acetate, polyesters, polyurethanes, and halogen-containing polymers and copolymers. The overcoat formulation will depend on the binder used for the alanine layer and must be such that the alanine layer is not significantly disturbed by its application. Alternatively, the dosimeter may be fully encapsulated by coating the overcoating material after the dosimeter is cut to its final size. Dipping the dosimeter into a polymer solution and allowing the resulting coating to dry would result in a dosimeter fully encased in a polymer coating. Again, the encapsulating formulation will depend on the binder used for the alanine layer and must be such that the alanine layer is not significantly disturbed by its application.

The problem of controlling accumulated charge is well known. It is generally known in the photographic film art that electrostatic charge can be dissipated effectively by incorporating one or more electrically-conductive layers into the film structure. It has been found that the incorporation of electrically-conductive layers into the film structure of the alanine based dosimeters is similarly effective. Conducting layers can be applied to one or to both sides of the film base as subbing layers either beneath or on the side opposite to the alanine-containing layers. An conducting layer can alternatively be applied as an outer coated layer either over the alanine layer or on the side of the film base opposite to the alanine layer or both.

A wide variety of electrically-conductive materials can be incorporated into the conductive layer to produce a wide range of conductivity. These can be divided into two broad groups: (i) ionic conductors and (ii) electronic conductors. In ionic conductors charge is transferred by the bulk diffusion of charged species through an electrolyte. Here the resistivity of the conductive layer is dependent on temperature and humidity. Conductive layers containing simple inorganic salts, alkali metal salts of surfactants, ionic conductive polymers, polymeric electrolytes containing alkali metal salts, and colloidal metal oxide sols (stabilized by metal salts), described previously in patent literature, fall in this category. However, many of the inorganic salts, polymeric electrolytes, and low molecular weight surfactants used are water-soluble and can be leached out of the conductive layers, resulting in a loss of conductive function. The poor performance of ionic conductors in low humidity environments can be a problem in their use.

The conductivity of conductive layers employing an electronic conductor depends on electronic mobility rather than ionic mobility and is independent of humidity. Conductive layers containing electronic conductors such as conjugated conducting polymers, conducting carbon particles, crystalline semiconductor particles, amorphous semiconductive fibrils, and continuous semiconducting thin films can be used more effectively than ionic conductors to dissipate static charge since their electrical conductivity is independent of relative humidity and only slightly influenced by ambient temperature.

Of the various types of electronic conductors, metal-containing particles, such as semiconducting metal oxides, can be dispersed in polymeric film-forming binders in combination with polymeric non-film-forming particles as described in U.S. Pat. Nos. 5,340,676; 5,466,567; 5,700,623. Binary metal oxides doped with appropriate donor heteroatoms or containing oxygen deficiencies have been disclosed in prior art to be useful in antistatic layers for photographic elements, for example, U.S. Pat. Nos. 4,275,103; 4,416,963; 4,495,276; 4,394,441; 4,418,141; 4,431,764; 4,571,361; 4,999,276; 5,122,445; 5,294,525; 5,382,494; 5,459,021; 5,484,694 and others. Conductive metal oxides can include: zinc oxide, titania, tin oxide, alumina, indium oxide, silica, magnesia, zirconia, barium oxide, molybdenum trioxide, tungsten trioxide, and vanadium pentoxide. Other doped conductive metal oxide granular particles can include antimony-doped tin oxide, fluorine-doped tin oxide, aluminum-doped zinc oxide, and niobium-doped titania. Additional conductive ternary metal oxides disclosed in U.S. Pat. No. 5,368,995 may include zinc antimonate and indium antimonate. Other conductive metal-containing granular particles including metal borides, carbides, nitrides and silicides have been disclosed in Japanese Kokai No. JP 04-055,492.

The electrically conductive layers may also be formed by evaporating various metals onto the surface of the support. Evaporated films of nickel and aluminum are well known in the art as capable of forming highly conducting layers.

Electronically conductive polymers have recently received attention from various industries as alternatives to conventional conducting particulate materials. Examples of these polymers include substituted or unsubstituted pyrrole-containing polymers (as mentioned in U.S. Pat. Nos. 5,665,498 and 5,674,654), substituted or unsubstituted thiophene-containing polymers (as mentioned in U.S. Pat. Nos. 5,300,575; 5,312,681; 5,354,613; 5,370,981; 5,372,924; 5,391,472; 5,403,467; 5,443,944; 5,575,898; 4,987,042 and 4,731,408) and substituted or unsubstituted aniline-containing polymers (as mentioned in U.S. Pat. Nos. 5,716,550; 5,093,439 and 4,070,189. Because of their electronic rather than ionic conductivity, these polymers are conducting even at relative humidity as low as 5%, as demonstrated in U.S. Pat. No. 6,124,083 and copending application U.S. Ser. No. 09/173,409.

Conductivity levels from 10 ohm per square to $10^{10}$ ohm per square are useful. Conductivity in the range of $10^7$ to $10^{10}$ ohm per square is preferred as such conductivity levels are both effective and easily achieved in manufacturing practice.

Electrically conductive layers formed from any of the electronic conductors mentioned above are useful in the practice of this invention. The primary requirements for the conductive material are that they provide a sufficient level of conductivity and that they do not interact with the electron beam to produce stable free radicals which would interfere with the signal protected from the alanine. Preferred among the conductors mentioned above is the conductive polymer polythiophene. This material forms electrically conductive layers with appropriate conductivity and is easily coated from solutions on common coating machinery.

EXAMPLES

1. Preparation of the Conductive Support 100 gm of Polythiophene, 5 gm of a aqueous polyester dispersion (AQ29D, Eastman Chemical) and 5 gm of a surfactant (Surfactant 10G, Olin Mathieson Co.) were added to 900 gm of distilled water to make a coating solution. The solution was applied to a, white pigmented, polyester support, which had been subbed for adhesion promotion, by means of a skim-pan air-knife hopper arrangement whose parameters were set to provide a wet coverage of about 8.7 mgms/ft$^2$. The coating was dried by forced air to give a layer whose conductivity was measured as $7.9 \times 10^8$ ohm/square.

2. Preparation of the Alanine Dispersion 224 grams of binder (Kynar 72101—Atochem) were added to 1296 grams of acetone and stirred until polymer was completely dissolved. To the polymer solution was added to 336 grams of L-alanine (Kyowa Hakko Inc.) and 1.0 grams of a silicone-based coating aid (DC1248, Dow Corning Inc.). The resulting dispersion was passed through a media mill containing three mm glass beads at a loading of 70% of the empty volume of the chamber. The rate at which the dispersion was passed through the mill was determined by measuring the particle size of the initial output from the mill and adjusting mill parameters to give the desired particle size distribution. The median particle size of the final dispersion was about 25 microns. The solids content of the dispersion was adjusted to between 25 and 30 percent to provide a coating viscosity of 500-1000 cps.

3. Coating of the Alanine Dispersion

The alanine dispersion prepared above was applied to the support by means of an extrusion hopper fed by a gear pump. The pumping rate was adjusted to give a coating thickness of about 130 microns. The coated alanine layer was dried in the coating machine through the use of forced warm air drying. Drying was done in stages with the initial drying being at lower temperatures, 25-35° C., and reduced airflow, and the final drying being at 80-100° C. The support with its coated alanine layer was then wound in a roll.

4. Finishing of the Alanine Dosimeter Strips

The support coated in Step 3 above was mounted on to a precision chopping device. The support was fed through the guillotine blade of the chopper and strips of 4 mm width produced.

Example 1

Control

Alanine dosimeters were prepared by coating and alanine containing layer as described above on to white, titanium dioxide pigmented, polyester support. The support's conductivity was measured as >$10^{12}$ ohms per square.

Example 2

Invention

Alanine dosimeters were prepared by coating and alanine containing layer as described above on to white, titanium dioxide pigmented, polyester support. The support had been coated as described above with a polythiophene conductive layer on the side opposite that used for coating of the alanine containing layer. The support's conductivity was measured as $1\text{-}5 \times 10^8$ ohms per square.

Testing of the Alanine Dosimeter Strips.

Club control dosimeters and those of the invention were placed in the beam of an electron been radiator (Rbodotron T200, IBA Technology) to a dose of 40 kGy. The samples were removed from the irradiator and immediately placed in the measurement cell of an EPR spectrometer and measurements taken.

Measurements were continued at 15 minute intervals for a total time of 30 hours. Signal fading was determined by calculating the difference in signal at each time versus the average signal recorded between 20 and 30 hours after irradiation. The results are shown in the table below:

| Time after irradiation (hours after irradiation) | Signal difference (control dosimeter) | Signal difference (dosimeter of the invention) |
|---|---|---|
| 0 | +2.5% ± 0.5% | 0% ± 0.5% |
| 2.5 | +1% ± 0.5% | 0% ± 0.5% |
| 5 | +0.7% ± 0.5% | 0% ± 0.5% |
| 10 | +0.5% ± 0.5% | 0% ± 0.5% |
| 20 | 0% ± 0.5% | 0% ± 0.5% |
| 30 | 0% ± 0.5% | 0% ± 0.5% |

The test results show that conductive layers as described in the invention are effective in reducing signal fading due to accumulated charge from electron beam exposure and allow measurement of dose directly after beam exposure. The steady loss in signal experienced by the control dosimeter does not allow the measurement of the irradiation dosage to a stable degree until about 20 hours after irradiation, while the dosimeters of the invention can be used to determine irradiation dosage with certainty very shortly after irradiation.

What is claimed is:

1. An element for ascertaining radiation dosage comprising:
   a flexible polymeric support, a first coated layer, said first coated layer comprising an electrically conducting material and a first binder and a second coated layer, said second coated layer comprising a second binder and alanine wherein the alanine, upon exposure to ionizing radiation, produces radicals that remain stable for long periods of time, wherein the binder of the second coated layer is a polymer or polymer blend whose permeability $\times 10^{13}$ to water or water vapor is less than 100 cm$^3$ (at STP)×cm/(cm$^2$×s ×Pa), wherein s is the time in seconds and Pa is the pressure in Pascals.

2. The element of claim 1 wherein the conducting material is an electronic conductor whose conductivity is independent of relative humidity.

3. The element of claim 2 wherein the electronic conductor is a particulate conductor dispersed in a binder.

4. The element of claim 2 wherein the electronic conductor is a finely divided metal oxide.

5. The element of claim 2 wherein the electronic conductor is a polymeric conductor.

6. The element of claim 5 wherein the polymeric electronic conductor is polythiophene.

7. The element of claim 1 wherein the electrically conducting material is coated on the side of the support opposite the alanine-containing layer.

8. The element of claim 1 wherein the electrically conducting material is coated on the same side of the support as the alanine-containing layer.

9. The element of claim 1 wherein the electrically conducting material is coated over the alanine-containing layer.

10. The element of claim 1 wherein the alanine is in crystalline form.

11. The element of claim 1 wherein a surface of the support is entirely or partially covered by the second, alanine-containing, coated layer.

12. The element of claim 1 wherein the support is a polyethylene film, a polyamide film, a polyimide film, a polypropylene film, a polycarbonate, a cellulosic support, or a polyester support.

13. The element of claim 1 wherein the support is ordinary paper, processed paper, coated paper, art paper, baryta paper, or resin-coated paper.

14. The element of claim 1 wherein the support is between 2 and 14 mils. in thickness.

15. The element of claim 1 wherein the support is between 6 and 10 mils. in thickness.

16. The element of claim 1 wherein the support is a pigmented polyester.

17. The element of claim 1 wherein the support is white polyester pigmented with titanium dioxide or barium sulfate.

18. The element of claim 1 wherein at least one side of the support has on it an adhesion promoting layer.

19. The element of claim 10 wherein the crystalline alanine comprises particles less than 100 microns in size.

20. The element of claim 10 wherein the crystalline alanine comprises particles between 1 and 40 microns in size.

21. The element of claim 1 wherein the binder of the second coated layer is an elastomeric binder whose elongation to break is at least 10%.

22. The element of claim 1 wherein the binder of the second coated layer is a solvent soluble polyester, a vinyl elastomer, or a polyurethane.

23. The element of claim 1 wherein the binder of the second coated layer is an ethylene-vinylacetate copolymer, an alkyl methacrylate or an acrylates with more than 3 carbon atoms.

24. The element of claim 1 wherein the binder of the second coated layer is an aromatic polyurethane or an aliphatic polyurethane.

25. The element of claim 1 wherein the binder of the second coated layer is a polymer or polymer blend whose permeability $\times 10^{13}$ to water or water vapor is less than 10 cm$^3$ (at STP)×cm/(cm$^2$×s ×Pa), where s is the time in seconds and Pa is the pressure in Pascals.

26. The element of claim 1 wherein the binder of the second coated layer is a copolymer containing vinylidene fluoride or vinylidene chloride.

27. The element of claim 1 wherein the binder of the second coated layer is a polymer blend of poly(methyl methacrylate) and a vinylidene fluoride-containing copolymer.

28. The element of claim 1 wherein the binder of the second coated layer is between 10 and 80 weight percent of the final, second coated layer.

29. The element of claim 1 wherein the binder of the second coated layer is between 35 and 50 weight percent of the second coated layer.

30. The element of claim 1 wherein the second coated layer comprising a binder and an alanine contains other additives.

31. The element of claim 30 wherein the other additives include amorphous silica or alumina.

32. The element of claim 31 wherein the amorphous silica or alumina is present in amounts from 0.1 to 5% of the weight of the alanine.

33. The element of claim 30 wherein the additive is silica at levels from 0.25-1% by weight of the alanine.

34. The element of claim 30 wherein the additive is a surfactant.

35. The element of claim 34 wherein the surfactant is present in amounts from 0.01-1% weight % of the alanine-containing dispersion.

36. The element of claim 1 wherein the second coated layer is between 100 and 200 microns thick.

37. The element of claim 1 wherein the second coated layer is between 125 and 175 microns thick.

38. The element of claim 1 further comprising a protective overcoat.

* * * * *